(12) United States Patent
Conjeti et al.

(10) Patent No.: US 12,499,549 B2
(45) Date of Patent: Dec. 16, 2025

(54) PROCESSING 2-D PROJECTION IMAGES USING A NEURAL NETWORK

(71) Applicant: Siemens Healthcare GmbH, Erlangen (DE)

(72) Inventors: Sailesh Conjeti, Erlangen (DE); Alexander Preuhs, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 690 days.

(21) Appl. No.: 17/699,837

(22) Filed: Mar. 21, 2022

(65) Prior Publication Data

US 2022/0309675 A1 Sep. 29, 2022

(30) Foreign Application Priority Data

Mar. 23, 2021 (DE) ...................... 10 2021 202 784.9

(51) Int. Cl.
*G06T 7/11* (2017.01)
*G06T 7/00* (2017.01)
*G06T 7/174* (2017.01)

(52) U.S. Cl.
CPC .............. *G06T 7/11* (2017.01); *G06T 7/0012* (2013.01); *G06T 7/174* (2017.01); *G06T 2207/10116* (2013.01); *G06T 2207/20084* (2013.01)

(58) Field of Classification Search
CPC ......... G06T 7/11; G06T 7/0012; G06T 7/174; G06T 2207/10116; G06T 2207/20084; G06T 2207/20081; G06T 2207/30064; G06T 7/33; G06T 2207/10016; G06T 7/35; G06T 2207/30004; G06N 3/084; G06V 10/764; G06V 10/82
See application file for complete search history.

(56) References Cited

U.S. PATENT DOCUMENTS

| | | | |
|---|---|---|---|
| 2005/0027193 A1* | 2/2005 | Mitschke | A61B 34/20 600/427 |
| 2009/0021614 A1* | 1/2009 | Baker | H04N 23/698 348/262 |
| 2009/0074277 A1* | 3/2009 | Deinzer | G06T 7/38 382/130 |
| 2009/0180678 A1* | 7/2009 | Kuduvalli | A61B 6/588 382/154 |

(Continued)

FOREIGN PATENT DOCUMENTS

| | | |
|---|---|---|
| CN | 104376552 A | 2/2015 |
| CN | 111476835 A | 7/2020 |

OTHER PUBLICATIONS

Liu, Xinhang, et al. "Unsupervised multi-view object segmentation using radiance field propagation." Advances in Neural Information Processing Systems 35 (2022): 17730-17743. (Year: 2022).*

(Continued)

*Primary Examiner* — Charles T Shedrick
(74) *Attorney, Agent, or Firm* — Harness, Dickey & Pierce, P.L.C.

(57) ABSTRACT

Techniques are described to infer 2-D segmentations of a region of interest using a neural network algorithm. Techniques are described to train the neural network algorithm. The 2-D segmentations are determined based on multiple 2-D projection images. For example, x-ray images can be used as an input.

16 Claims, 4 Drawing Sheets

(56) References Cited

U.S. PATENT DOCUMENTS

| | | | | |
|---|---|---|---|---|
| 2010/0021031 | A1* | 1/2010 | Brockway | G06T 7/44 382/128 |
| 2012/0219185 | A1* | 8/2012 | Hu | G06T 7/77 382/103 |
| 2013/0108103 | A1* | 5/2013 | Thueux | G06V 20/13 382/103 |
| 2013/0208948 | A1* | 8/2013 | Berkovich | H04N 13/204 348/46 |
| 2013/0208997 | A1* | 8/2013 | Liu | G06T 7/33 382/284 |
| 2014/0078250 | A1* | 3/2014 | Zhang | H04N 19/513 348/43 |
| 2014/0293028 | A1* | 10/2014 | Nguyen | H04N 13/305 348/59 |
| 2015/0339828 | A1* | 11/2015 | Djelouah | G06T 7/194 382/173 |
| 2016/0093058 | A1 | 3/2016 | Moteki et al. | |
| 2016/0373715 | A1* | 12/2016 | Nguyen | H04N 13/128 |
| 2017/0148222 | A1* | 5/2017 | Holzer | H04N 23/698 |
| 2020/0364509 | A1* | 11/2020 | Weinzaepfel | G06F 18/214 |
| 2021/0103776 | A1* | 4/2021 | Jiang | G06T 19/20 |
| 2021/0125402 | A1* | 4/2021 | Chui | G06T 5/60 |
| 2021/0125403 | A1* | 4/2021 | Chui | G06F 16/78 |
| 2022/0287686 | A1* | 9/2022 | Kruecker | A61B 8/5261 |
| 2022/0309675 | A1* | 9/2022 | Conjeti | G06T 7/0012 |
| 2023/0410364 | A1* | 12/2023 | Tsoref | G06V 10/764 |
| 2024/0144589 | A1* | 5/2024 | Liu | G06V 20/70 |

OTHER PUBLICATIONS

Rana, Pravin Kumar, and Markus Flierl. "Inter-view depth consistency testing in depth difference subspace." arXiv preprint arXiv: 2301.11752 (2023). (Year: 2023).*

M. Kurc, O. Stankiewicz and M. Domański, "Depth map inter-view consistency refinement for multiview video," 2012 Picture Coding Symposium, Krakow, Poland, 2012, pp. 137-140, doi: 10.1109/PCS.2012.6213305. (Year: 2012).*

S. Jeong, J. Lee, B. Kim, Y. Kim and J. Noh, "Object Segmentation Ensuring Consistency Across Multi-Viewpoint Images," in IEEE Transactions on Pattern Analysis and Machine Intelligence, vol. 40, No. 10, pp. 2455-2468, Oct. 1, 2018 (Year: 2018).*

Würfl et al. "Estimating the Fundamental Matrix Without Point Correspondences With Application to Transmission Imaging" CVPR 2019.

Preuhs, Alexander et al., "Maximum likelihood estimation of head motion using epipolar consistency", CT-Meeting, 2018.

Gundel et al., "Multi-task Learning for Chest X-ray Abnormality Classification on Noisy Labels"; May 2019, IEEE; 2019.

Yao, Yuan et al: "Multiview Co-segmentation for Wide Baseline Images using Cross-view Supervision"; In: Proceedings of the IEEE/CVF Winter Conference on Applications of Computer Vision; Year: 2020, pp. 1942-1951.

Bier et al.;"X-ray-transform Invariant Anatomical Landmark Detection for Pelvic Trauma Surgery", https://link.springer.com/chapter/10.1007/978-3-030-00937-3_7.

Schaffert, R. et al., "Learning an Attention Model for Robust 2-D/3-D Registration Using Point-To-Plane Correspondences", IEEE Transactions on Medical Imaging.

Lin et al., "Focal Loss for Dense Object Detection," 2017, Proceedings of the IEEE International Conference on Computer Vision (ICCV), pp. 2980-2988.; 2017.

Aichert et al., "Redundancies in X-ray images due to the epipolar geometry for transmission imaging", The third international conference on image formation in X-ray computed tomography, pp. 333-337.

* cited by examiner

PROCESSING 2-D PROJECTION IMAGES USING A NEURAL NETWORK

CROSS-REFERENCE TO RELATED APPLICATION(S)

The present application hereby claims priority under 35 U.S.C. § 119 to German patent application number DE 102021202784.9 filed Mar. 23, 2021, the entire contents of which are hereby incorporated herein by reference.

TECHNICAL FIELD

Various examples of the disclosure generally relate to a neural-network algorithm used to process multiple 2-D projection images. Various examples specifically relate to inference and training of the neural-network algorithm.

BACKGROUND

In medical X-ray imaging application scenarios, 2-D projection images (a synonym for the term "2-D" is two-dimensional) are acquired. The 2-D projection image depict the patient's anatomy using multiple views. Another term for 2-D projection image is radiography image or 2-D X-ray image.

Due to the projective nature of the 2-D projection images, pathologies can be better classified if two or more projection images from different geometric viewpoints are available (i.e., using multiple views). For example, vessel endings might appear as a pulmonary nodule one view, resulting in a false positive detection for nodules, while clearly visible in a second view acquired from a different angulation. This can be rectified by considering additional information available in the second view. Therefore, exploiting several images acquired from multiple views for classification and detection of pathologies is beneficial.

There are techniques known to assist a practitioner in such tasks. For example, a neural network algorithm (NN) can be used to detect and/or classify an object. The object can be a region of interest (ROI). The NN is typically trained based on multiple sets of training data, each set of training data including multiple training 2-D projection images with annotated ground-truth.

It has been observed that such existing NNs sometimes can exhibit a limited accuracy.

SUMMARY

Accordingly, there is a need for advanced techniques of detecting and/or classifying ROIs in 2-D projection images using NNs.

This need is met by the features of the independent claims. The features of the dependent claims define embodiments.

A method includes obtaining multiple 2-D projection images. The multiple 2-D projection images are associated with multiple views of a scene. The method also includes determining, using at least one neural network algorithm and for the multiple 2-D projection images, multiple 2-D segmentations of a region of interest included in the scene. The multiple 2-D segmentations are associated with the multiple views. The method also includes determining an inter-view consistency between the 2-D segmentations associated with the multiple views based on a predefined registration of the multiple views. In particular, the 2-D projection images can be medical images of a patient.

In one example obtaining an image can comprise receiving the image (e.g. by an interface) from an external entity. In another example obtaining an image can comprise generating the image with an imaging device.

A computer program or a computer-program product or a computer-readable storage medium includes program code. The program code can be loaded and executed by a processor. Upon executing the program code, the processor performs a method. The method includes obtaining multiple 2-D projection images. The multiple 2-D projection images are associated with multiple views of a scene. The method also includes determining, using at least one neural network algorithm and for the multiple 2-D projection images, multiple 2-D segmentations of a region of interest included in the scene. The multiple 2-D segmentations are associated with the multiple views. The method also includes determining an inter-view consistency between the 2-D segmentations associated with the multiple views based on a predefined registration of the multiple views.

A device includes a processor. The processor is configured to obtain multiple 2-D projection images associated with multiple views of the scene. The processor is further configured to determine, using at least one neural network algorithm and for the multiple 2-D projection images, multiple 2-D segmentations of a region of interest included in the scene. The multiple 2-D segmentations are associated with the multiple views. The processor is further configured to determine an inter-view consistency between the 2-D segmentations associated with the multiple views based on a predefined registration of the multiple views in a reference frame.

A method includes obtaining multiple 2-D projection images. The multiple 2-D projection images are associated with multiple views of a scene. The method also includes determining a 3-D segmentation (a synonym for the term "3-D" is three-dimensional) of a region of interest included in the scene. This is done using at least one neural network algorithm and based on the multiple 2-D projection images. The method further includes determining multiple 2-D segmentations of the region of interest associated with the multiple views based on a predefined registration of the multiple views in a reference frame and based on the 3-D segmentation.

A computer program or a computer-program product or a computer-readable storage medium includes program code. The program code can be loaded and executed by a processor. Upon executing the program code, the processor performs a method. The method includes obtaining multiple 2-D projection images. The multiple 2-D projection images are associated with multiple views of a scene. The method also includes determining a 3-D segmentation of a region of interest included in the scene. This is done using at least one neural network algorithm and based on the multiple 2-D projection images. The method further includes determining multiple 2-D segmentations of the region of interest associated with the multiple views based on a predefined registration of the multiple views in a reference frame and based on the 3-D segmentation.

A device includes a processor. The processor is configured to obtain multiple 2-D projection images. The multiple 2-D projection images are associated with multiple views of a scene. The processor is further configured to determine, using at least one neural network algorithm and based on the multiple 2-D projection images, a 3-D segmentation of a region of interest included in the scene. The processor is further configured to determine, based on a predefined registration of the multiple views in a reference frame and based on a 3-D segmentation, multiple 2-D segmentations of the region of interest associated with the multiple views.

A method includes obtaining multiple training 2-D projection images associated with multiple views of a scene. The method also includes obtaining multiple reference 2-D segmentations of a region of interest included in the scene for the multiple training 2-D projection images. The method further includes determining, using at least one neural network algorithm and for the multiple training 2-D projection images, multiple 2-D segmentations of the region of interest. The method further includes determining a loss value based on the multiple 2-D segmentations, the multiple reference 2-D segmentations, and a predefined registration of the multiple views in a reference frame. The method further includes training at least one neural network algorithm based on the loss value.

A computer program or a computer-program product or a computer-readable storage medium includes program code. The program code can be loaded and executed by a processor. Upon executing the program code, the processor performs a method. The method includes obtaining multiple training 2-D projection images associated with multiple views of a scene. The method also includes obtaining multiple reference 2-D segmentations of a region of interest included in the scene for the multiple training 2-D projection images. The method further includes determining, using at least one neural network algorithm and for the multiple training 2-D projection images, multiple 2-D segmentations of the region of interest. The method further includes determining a loss value based on the multiple 2-D segmentations, the multiple reference 2-D segmentations, and a predefined registration of the multiple views in a reference frame. The method further includes training at least one neural network algorithm based on the loss value.

A device includes a processor. The processor is configured to obtain multiple training 2-D projection images associated with multiple views of a scene. The processor is further configured to obtain multiple reference 2-D segmentations of a region of interest included in the scene for the multiple training 2-D projection images. The processor is further configured to determine multiple 2-D segmentations of the region of interest using at least one neural network algorithm and for the multiple training 2-D projection images. The processor is further configured to determine a loss value based on the multiple 2-D segmentations, the multiple reference 2-D segmentations, and the predefined registration of the multiple views in a reference frame. Further, the processor is configured to train at least one neural network algorithm based on the loss value.

It is to be understood that the features mentioned above and those yet to be explained below may be used not only in the respective combinations indicated, but also in other combinations or in isolation without departing from the scope of example embodiments. In particular, features described with respect to one of the methods may be used in one of the other methods according to example embodiments as well as in one of the devices according to example embodiments. Furthermore, features described with respect to one of the devices may be used in one of the other devices according to example embodiments as well as on one of the methods according to example embodiments.

BRIEF DESCRIPTION OF THE DRAWINGS

The characteristics, features and advantages of example embodiments described above will become clearer and easier to understand in conjunction with the following figures and their descriptions. In this case the figures and descriptions are not intended to restrict example embodiments and its forms in any way.

In different figures the same components are provided with corresponding reference characters. As a rule the figures are not true-to-scale.

DETAILED DESCRIPTION

Figure 1:
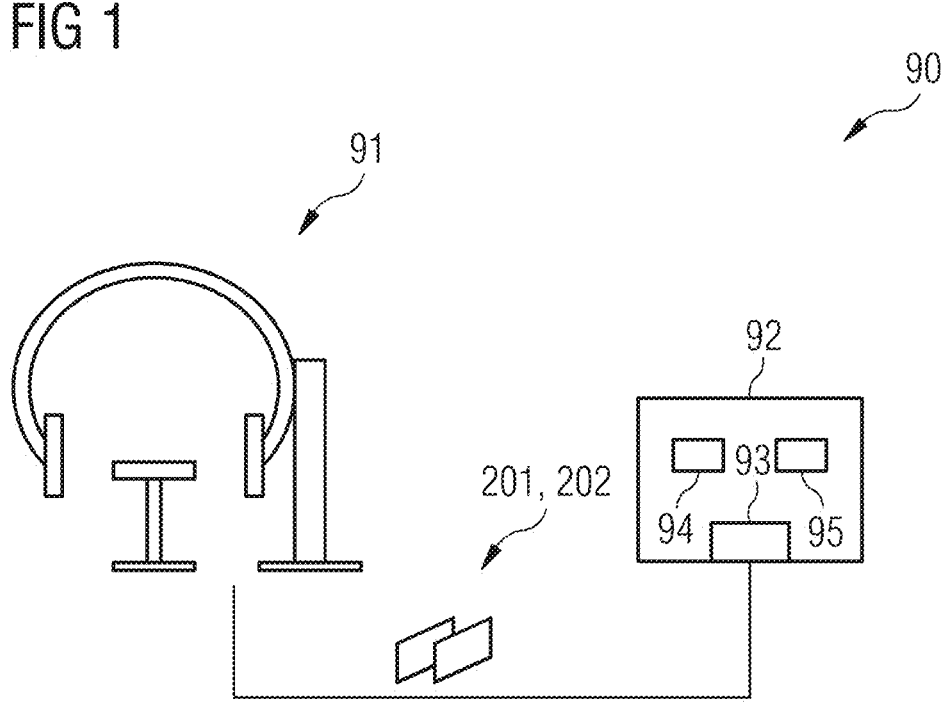
FIG. 1 schematically illustrates a system including an imaging facility and a device for processing 2-D projection images acquired using the imaging facility according to various examples.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one example embodiment, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes;

etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, at least some example embodiments will be described in detail with reference to the accompanying drawings. It is to be understood that the following description of example embodiments is not to be taken in a limiting sense. The scope of example embodiments is not intended to be limited by the embodiments described hereinafter or by the drawings, which are taken to be illustrative only.

Various examples generally relate to processing 2-D projection images. The 2-D projection images that can be processed according to the techniques disclosed herein can be acquired in various application scenarios. For example application scenarios include, but are not limited to: medical imaging, e.g., using a C-arm X-ray machine as imaging modality; security X-ray scanners, e.g., at an airport; material inspection; electron beam microscopy; etc. Hereinafter, for illustrative purposes, examples will be discussed for medical application scenarios, but respective techniques can be readily applied in other fields.

A 2-D projection image depicts a scene using a certain view. Different 2-D projection images can be associated with different views. Therefore, objects in the scene appear on the different angles. For instance, each view could be characterized by a position and orientation (pose) of a virtual camera in a reference frame, as well as by an image plane into which objects of the scene are projected by the virtual camera.

According to various examples, at least one NN is used to detect and/or classify an object of the scene in the multiple 2-D projection images.

Hereinafter, a scenario will be described in which a NN implements multiple tasks, e.g., encoding 2-D projection images into latent features and decoding the latent features for regression and/or classification. In some scenarios, multiple NNs may be used to implement such multiple tasks. For sake of simplicity a scenario is explained in which the functionality is integrated in a single NN, but generally the respective functionality can be implemented by at least one NN.

As a general rule, the NN could be implemented by multiple layers, e.g., convolutional layers, normalization, pooling layers, fully connected layers etc. The NN can include multiple branches, e.g., to process different 2-D projection images and/or to provide different outputs, e.g., a classification output and/or a regression output.

For instance, the ROI can be segmented in the multiple 2-D projection images. As a general rule, throughout the disclosure a "segmentation" can generally denote a highlighting of the ROI. The highlighting can be in the form of a bounding box. The bounding box can have a predefined shape, e.g., rectangular, square, cube, spherical, or cuboid; the minimum sized bounding box having the predefined shape that fits the ROI can be determined. For example, a bounding-box regression could be implemented, see Lin, T. Y., Goyal, P., Girshick, R., He, K. and Dollar, P., 2017. Focal loss for dense object detection. In Proceedings of the IEEE international conference on computer vision (pp. 2980-2988). The highlighting could also include defining a pixel-by-pixel mask, i.e., judging for each pixel whether the respective pixel is or is not part of the ROI. Intermediate scenarios between bounding boxes and pixel-by-pixel masks are possible.

The segmentation may be a 2-D or 3-D segmentation. The 3-D segmentation could be defined in different ways, e.g., by a 3-D bounding box that may be based on a 3-D sphere or a skewed cube, etc. The 3-D segmentation may be implemented by a 3-D structure that can be created from 2-D rectangles, and vice versa. A 3-D mask could be determined, selecting certain voxels in 3-D space.

Various examples described herein exploit a geometrical relationship between multiple views of the multiple 2-D projection images. More specifically, a predefined registration between multiple views of the multiple 2-D projection images and a reference frame can be used. For instance, the predefined registration could be used in the training of the NN. Alternatively, or additionally, the predefined registration could be used during inference using the NN.

By considering the predefined registration, an increased accuracy of the detection and/or classification using the NN can be achieved. In particular, an inter-view semantic context of the ROI can be taken into account by being able to "translate" the appearance of the semantic context between the different views, thereby avoiding inconsistencies between the detection and/or classification as may result from considering each view in isolation according to reference implementations.

By virtue of the predefined registration, the view of each one of the multiple 2-D projection images can have a well-defined arrangement in the reference frame. For example, the pose of a respective virtual camera with respect to the scene can be defined in the reference frame.

The reference frame could be globally defined. For example, a reference coordinate system could be used. The reference frame could also be defined by a respective one of the multiple views; thereby, a direct view-to-view transformation is facilitated.

There are multiple options available for implementing the registration of each view in the reference frame. Two options are summarized in TAB. 1. These options rely on transforming one view into another view; i.e., in those options, the reference view is aligned with one of the two views.

TABLE 1

Various options for implementing a predefined registration between multiple views. These matrices can be determined in a so-called registration process. During a registration process, it would be possible to identify corresponding features in the multiple views and then calculate the matrices from the shift between the features.

| | |
|---|---|
| Fundamental matrix | The fundamental matrix F describes the relative geometry of two views and constrains the relation between two image points $x_1$ and $x_2$ in the respective 2-D projection images, whereas $x_1$ is in the first projection image and $x_2$ in the second projection image:<br>$x_1^T F x_2 = 0$<br>The fundamental matrix describes the relative geometry with a minimum number of parameters (i.e., seven) which allows a more robust estimation compared to more advanced models (e.g., projection matrices with 11 free parameters, see below).<br>The fundamental matrix can be estimated by a multitude of methods assuming only rigid movements within the views available. For example, the matrix can be estimated using plane-to-point correspondences based on the structure of certain reference points in the scene, e.g., the structure of ribs where the scene includes the torso of a patient. This is described, e.g., in Schaffert et al. "Learning an Attention Model for Robust 2-D/3-D Registration Using Point-To-Plane Correspondences" TMI 2020.<br>Alternatively or additionally, point correspondences can be learned directly from the 2-D projection images. See, e.g., Bastian Bier et al. *"X-ray-transform Invariant Anatomical Landmark Detection for Pelvic Trauma Surgery"*.<br>Further, multiple-view geometry - sometimes also referred to as epipolar geometry - can be used to estimate the fundamental matrix. See, e.g., Würfl et al. "Estimating the Fundamental Matrix Without Point Correspondences With Application to Transmission Imaging" CVPR 2019.<br>The specific estimation method to derive the fundamental matrix is not germane for the techniques described here. |
| Projection matrix | The projection matrix describes the geometric relation between points in 3-D and points on the detector plane of the respective view in 2-D. This includes the full description of the view position in 3-D as well as intrinsic parameters of the imaging modality (e.g., pixel spacing, coordinate offset, etc.) used to acquire the respective 2-D projection image. The matrix gives a relation between a point in 3-D $x_1$ - e.g., a corner of a 3-D object - and the corresponding point projected to the detector in 2-D $x_2$ by<br>$x_2 = P x_1$<br>where $x_1$ and $x_2$ are described in terms of homogeneous coordinates.<br>The projection matrix can be estimated by a multitude of methods assuming only rigid deformations between both views. |

TABLE 1-continued

Various options for implementing a predefined registration between multiple views. These matrices can be determined in a so-called registration process. During a registration process, it would be possible to identify corresponding features in the multiple views and then calculate the matrices from the shift between the features.

| |
|---|
| To estimate the projection matrix, standard registration approaches to a standard patient model can be performed. See, e.g., Schaffert et al. "Learning an Attention Model for Robust 2-D/3-D Registration Using Point-To-Plane Correspondences" TMI 2020<br>Bastian Bier et al. "X-ray-transform Invariant Anatomical Landmark Detection for Pelvic Trauma Surgery".<br>Alternatively, epipolar consistency can be applied for the estimation of the projection matrix. See, e.g., Preuhs et al "Maximum likelihood estimation of head motion using epipolar consistency". |

There are various options available to consider the predefined registration of the multiple views—cf. TAB. 1—associated with the 2-D projection images. For example, it would be possible to consider the predefined registration in a training phase of the NN (training will be explained in detail in connection with FIG. 2: box 3005 and FIG. 8 below). Alternatively or additionally, it would be possible to take into account the predefined registration in the inference phase of the NN (inference will be explained in detail in connection with FIG. 2: box 3010 and FIGS. 4 and 6 below). Some options for taking into account the predefined registration are summarized in TAB. 2 below.

TABLE 2

Various options for considering a predefined registration of the multiple views and a reference frame. Option I and II can rely on the fundamental matrix. This helps restricting the geometric relations needed to a minimum which poses the registration process of the two views simpler in terms of amount of parameters that need to be estimated. The simpler registration process comes with the cost that the regularization is only possible in terms of distance to the epipolar plane/line, if compared to full knowledge of the ROI position in 3-D as in example III.

| | Short description | Example details |
|---|---|---|
| I | At training: 2-D segmentations and inter-view consistency | Here, 2-D segmentations, e.g., 2-D bounding boxes or a 2-D mask, can be used. Each 2-D segmentation can be separately determined, e.g., using a dedicated decoder branch of the NN and based on the same shared latent features extracted from the multiple 2-D projection images.<br>During training of the NN, the 2-D segmentations can be enforced to be within the same epipolar plane, i.e., the distance of the upper corners of the 2-D segmentations (or another reference point) to the upper epipolar line should be minimal, as well as the distance of the lower epipolar line to the lower edge of the 2-D segmentation should be minimal. More generally, it would be possible to determine the distance between a first reference point of a first one of the multiple 2-D segmentations and the projection of a second reference point of a second one of the multiple 2-D segmentations into the view associated with the first one of the multiple 2-D segmentations. Here, typically only the distance in the direction perpendicular to the epipolar line is of interest. These reference points can denote a corresponding feature of |

TABLE 2-continued

Various options for considering a predefined registration of the multiple views and a reference frame. Option I and II can rely on the fundamental matrix. This helps restricting the geometric relations needed to a minimum which poses the registration process of the two views simpler in terms of amount of parameters that need to be estimated. The simpler registration process comes with the cost that the regularization is only possible in terms of distance to the epipolar plane/line, if compared to full knowledge of the ROI position in 3-D as in example III.

| Short description | Example details |
|---|---|
| | the ROI, e.g., in the above-identified example the upper or lower corners. The projection can be determined based on the predefined registration, e.g., the fundamental matrix. Enforcing the 2-D segmentations to lie in the same epipolar plane can mean that a loss function determines a loss value that is minimized during an iterative numerical optimization implementing the training, wherein the loss function determines the loss value depending on this distance. Larger distances are thereby penalized. Larger distances are associated with a reduced inter-view consistency. Thus, it is possible to determine an interview consistency between the 2-D segmentation associated with the multiple views based on the predefined registration. It would be possible to use the fundamental matrix - cf. TABLE 1 - for this. The loss value is determined depending on the interview consistency. A potential realization of the distance to the epipolar lines could be the mutual distance, i.e., the distance of the lower edge of a first 2-D segmentation to the epipolar lines defined by the lower edge of a second 2-D segmentation, combined with the distance of the lower edge of the second 2-D segmentation to the epipolar lines defined by the lower edge of the first 2-D segmentation. Further, distance can be defined as the Euclidean measure in perpendicular direction to the epipolar plane. The measure would be minimal if both 2-D segmentations enclose the same ROI. Other distance measures are possible. |
| II At inference: 2-D segmentations and inter-view consistency | In a comparable manner to example I, it would be possible to take into account the predefined registration when determining and inter-view consistency between the 2-D segmentations associated with the multiple views during inference. For instance, it would be possible to determine the distance between a first reference point of a first one of the multiple 2-D segmentations (e.g., upper or lower corner) and the projection of a second reference point of a second one of the multiple 2-D segmentations into the view associated with the first one of the multiple 2-D segmentations. Larger distances are associated with lower inter-view consistency, and vice versa. This projection could be implemented by the epipolar line that is defined by the respective view. Again, as already explained in example I, it would be possible to consider multiple distances between multiple reference points and respective projections, e.g., upper and lower edges of the 2-D segmentations. Also, it would be possible to consider distances for a projection from a first view to a second view, as well as from the second view to the first view, i.e., consider mutual distances. |
| III At training and inference: 3-D segmentation | In some examples, it would be possible that the NN is trained to determine a 3-D segmentation, i.e., a single decoder branch can be used that determine the 3-D segmentation having a 3-D position and 3-D extents in the reference frame. Then, it would be possible to derive the 2-D segmentations from the 3-D segmentation, using the predefined registration. A projection of the 3-D structure of the 3-D segmentation into the 2-D projection images can be determined. At training, a distance measure between the 3-D segmentation output by the NN and the 2-D segmentations of the ground truth can be established and the loss value can be determined by the loss function taking into account the distance measure. For example, the loss value can be determined based on the distance of the 2-D segmentation defined by the ground truth, to the respective projection of the 3-D segmentation into the view associated with the respective 2-D projection image. Alternatively, the distance can be measured by back-projecting the 2-D segmentation into 3-D space by estimating the distance between the back-projected 2-D segmentation and the network predicted 3-D segmentation. In such a scenario, inter-view consistency of the 2-D segmentations is inherently provided for during the inference phase, because the 2-D segmentations are determined based on one and the same 3-D segmentation using the predefined registration. |

FIG. 1 is a schematic illustration of a system 90 according to various examples. The system 90 includes an imaging facility 91, e.g., an X-ray C-arm. Multiple 2-D projection images 201, 202 are acquired using the imaging facility 91 and provided to a device 92. The device 92 includes a processor 94 and a memory 95. The processor 94 can obtain the 2-D projection images 201, 202 via the interface 93 and process the 2-D projection images 201, 202. For processing the 2-D projection images 201, 202, the processor 94 can load and execute program code from the memory 95.

Projection images 201, 202 could be processed during a training phase and/or an inference phase of a NN that can be executed by the processor 94 upon loading program code from the memory 95. Aspects with respect to the training phase and the inference phase are discussed below in connection with FIG. 2.

Figure 2:
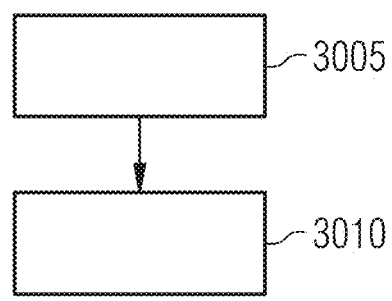
FIG. 2 is a flowchart of a method according to various examples.

FIG. 2 is a flowchart of a method according to various examples. The method of FIG. 2 could be implemented by the processor 94 of the device 92 of the system 90 as discussed in connection with FIG. 1.

At box 3005, a training phase is implemented. Here, a NN for processing 2-D projection images is trained. For this, an iterative numeric optimization can be implemented. Parameters of multiple layers of the NN can be adjusted in each iteration of the numeric iterative optimization. This can be done to minimize a loss value. The loss value can be determined based on a loss function. The loss value can depend on a difference between a prediction of the NN and ground truth labels. The ground truth labels could be manually determined. For example, a gradient descent scheme can be used to alter the parameters of the NN. Backpropagation can be used.

The NN can be configured to make various predictions with respect to a semantic context of the 2-D projection images. For instance, a ROI could be detected. In particular, a segmentation of a ROI depicted by the 2-D projection images could be provided. More specifically, multiple 2-D segmentations could be provided, one for each of the multiple 2-D projection images, i.e., the ROI—being depicted from multiple perspectives using the multiple 2-D projection images—could be highlighted in each one of the multiple 2-D projection images. Alternatively or additionally, it would also be possible to classify an object defining the ROI. For instance, the ROI could include an appearance of a pathology. Then, the pathology may be classified.

Once the NN has been trained, box 3010 can be executed. Here, it is possible to infer the 2-D segmentations of the ROI and/or classify the ROI without ground truth being available. Box 3010 denotes the inference phase.

Figure 3:
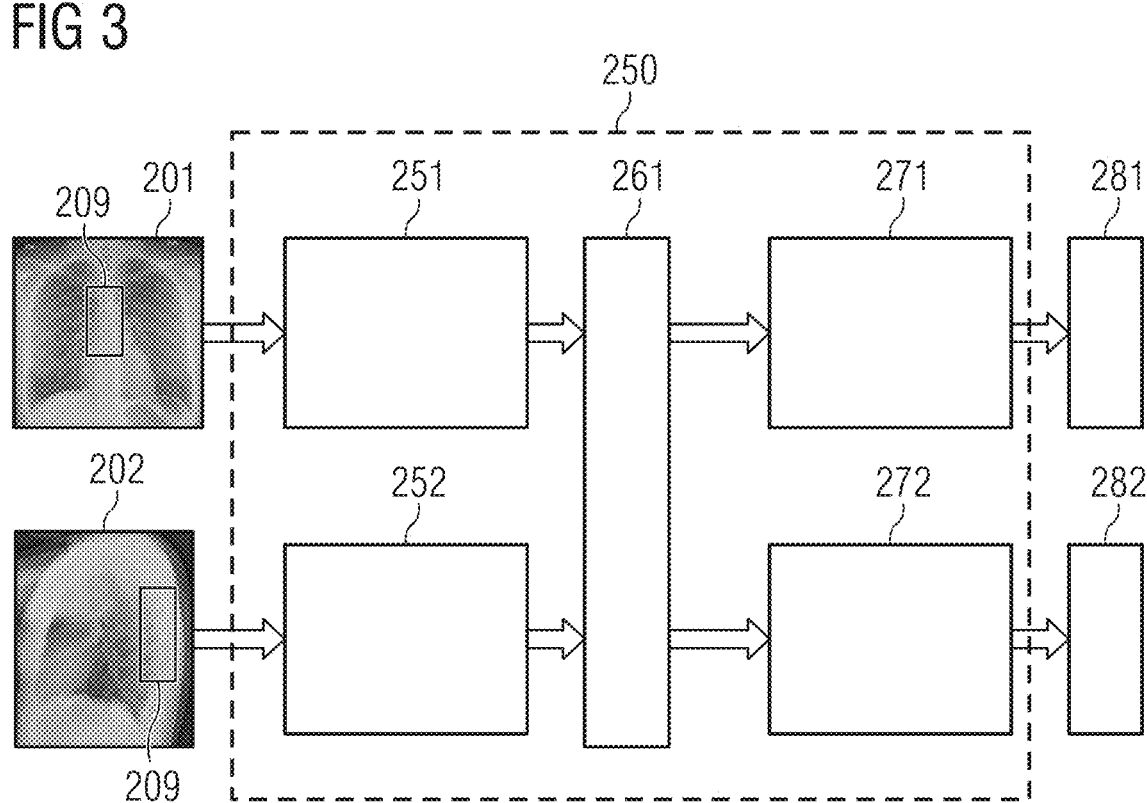
FIG. 3 schematically illustrates an architecture of a NN according to various examples.

FIG. 3 schematically illustrates a possible architecture of the NN 250. FIG. 3 schematically illustrates an input to the NN 250 including the 2-D projection images 201, 202.

There are two encoder branches 251, 252 operating on the 2-D projection images 201, 202 to extract latent features. In a common encoder branch 261, these latent features of each one of the to the projection images 201, 202 are merged, to determine a set of shared latent features.

This set of shared latent features is then fed to the decoder branches 271, 272. An output 281 of the decoder branch 271 provides for a classification of a ROI 209 depicted by the 2-D projection images 201, 202. In the illustrated example, the ROI 209 could include the spine of a patient, e.g., a vertebra suffering from a fracture. Such information (e.g., an indication of the particular vertebra and a type of the fracture, such as type A, compression injury, versus type B, distraction injury, versus type C, translation injury, or information on a neurological status) could be indicated by the respective output data 281.

Also illustrated as an output 282 of the decoder branch 272, the output 282 can include multiple 2-D segmentations of the ROI. For instance, respective pixel masks could be output or bounding boxes could be output; such data can be overlaid to the 2-D projection images 201, 202 to highlight the ROI.

In the illustrated example, a single decoder branch 272 is illustrated. It would be possible that multiple separate decoder branches are used in parallel, one for each 2-D segmentation. Here, 2-D segmentations can be natively output by the NN 250.

It would also be possible to use a common decoder branch that outputs a 3-D segmentation of the ROI. Then, the multiple 2-D segmentations can be derived from the 3-D segmentation, taking into account a predefined registration between the multiple views associated with the 2-D projection images 201, 202, in a reference frame.

Figure 4:
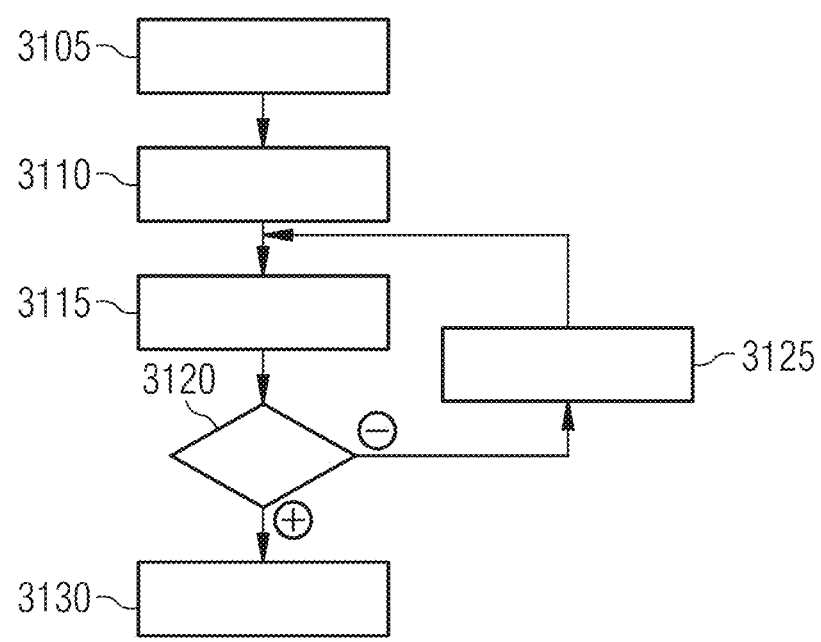
FIG. 4 is a flowchart of a method according to various examples.

FIG. 4 is a flowchart of a method according to various examples. For example, the method of FIG. 4 could be executed by the processor 94 of the device 92 upon loading program code from the memory 95. The method of FIG. 4 pertains to inference using a NN that has been previously trained. As such, FIG. 4 could be used to implement box 3010 of the method of FIG. 2.

The flowchart of FIG. 4 illustrates a scenario in which multiple 2-D segmentations are separately obtained, e.g., using separate decoder branches of the NN. Then, an inter-view consistency can be determined; cf. TAB. 2: example II. For example, the method of FIG. 4 can rely on the fundamental matrix, cf. TAB. 1.

In detail, at box 3105, multiple 2-D projection images are obtained. For instance, this could include sending control instructions to an imaging facility such as the imaging facility 91 of the system 90. Then, the 2-D projection images can be received from the imaging facility 91. The 2-D projection images could also be loaded from a picture archiving system (PACS) of a hospital.

The multiple 2-D projection images can be associated with predefined views, e.g., corresponding to certain setup of the patient and a configuration of the imaging facility. For example, a front and lateral view of the patient may be defined.

Next, at box 3110, using at least one NN, multiple 2-D segmentations of a ROI included in a scene that is depicted by the multiple 2-D projection images using multiple views are determined. These multiple 2-D segmentations are associated with the multiple views. A respective 2-D segmentation may be determined for each one of the multiple views.

For example, the NN 250 including various submodules such as the encoder branches 251-252, 261, as well as decoder branch 272 could be used. There can be a separate decoder branches provisioned for each one of the multiple 2-D segmentations. Different encoder branches can be associated with different views of the scene. As such, the views can be predefined. It would also be possible to determine the views—e.g., using a further NN or based on a user input— and then select the appropriate encoder branch.

Then, at box 3115, an inter-view consistency between the 2-D segmentations that are associated with the multiple views can be determined. This can be based on the predefined registration of the multiple views in a reference frame. Respective aspects have been discussed above in connection with TAB. 1.

Specifically, it would be possible that the determining of the inter-view consistency at box 3115 is based on the fundamental matrix.

The fundamental matrix—or, generally, the predefined registration—can be determined based on prior-knowledge of the configuration of the imaging facility used to acquire the multiple 2-D projection images. For example, if the configuration of the C-arm X-ray machine is known, this can be used to conclude on the views, and then it is possible to derive the fundamental matrix. The fundamental matrix could be calculated or loaded from a look-up table. Alternatively or additionally, it would also be possible to perform object recognition to identify the views. It would be possible to obtain a user input.

There are various options available for determining the inter-view consistency at box 3115. For instance, the inter-view consistency could be determined based on a distance between a first reference point of a first one of the multiple 2-D segmentations and the projection of a second reference point of a second one of the multiple 2-D segmentations into the view of the multiple views that is associated with the first one of the multiple 2-D segmentations. The first reference point and the second reference point can denote a corresponding feature of the ROI, e.g., an upper or a lower edge or a corner of a respective 2-D segmentation or a feature of the underlying scene that is depicted in the multiple 2-D projection images. The projection of the second reference point can be determined based on the predefined registration, e.g., using the fundamental matrix. Such projection can include an epipolar line defined in the view that is associated with the first one of the multiple 2-D segmentations.

The inter-view consistency can be determined not only based on the projection of the second reference point into the view associated with the first one of the multiple 2-D segmentation; it would also be possible to determine the inter-view consistency based on a further distance between the second reference point and the projection of the first reference point into the view of the multiple views that is associated with the second one of the multiple 2-D segmentations, i.e., a mutual distance can be considered.

The epipolar line is well-defined in the context of multiple view geometry. A brief explanation is given below. Consider an object point that defines an image point in the first view and further defines an image point in the second view (i.e., the object point is visible in both views). The epipolar line defined by that object point in the first view with respect to the second view is given by the image point in the first view and the epipolar point of the second view defined in the image plane of the first view. The epipolar point is defined as the point of intersection of the lines joining the centers of the virtual cameras with the image plane of the first view. The epipolar lines are also illustrated in FIG. 5.

Figure 5:
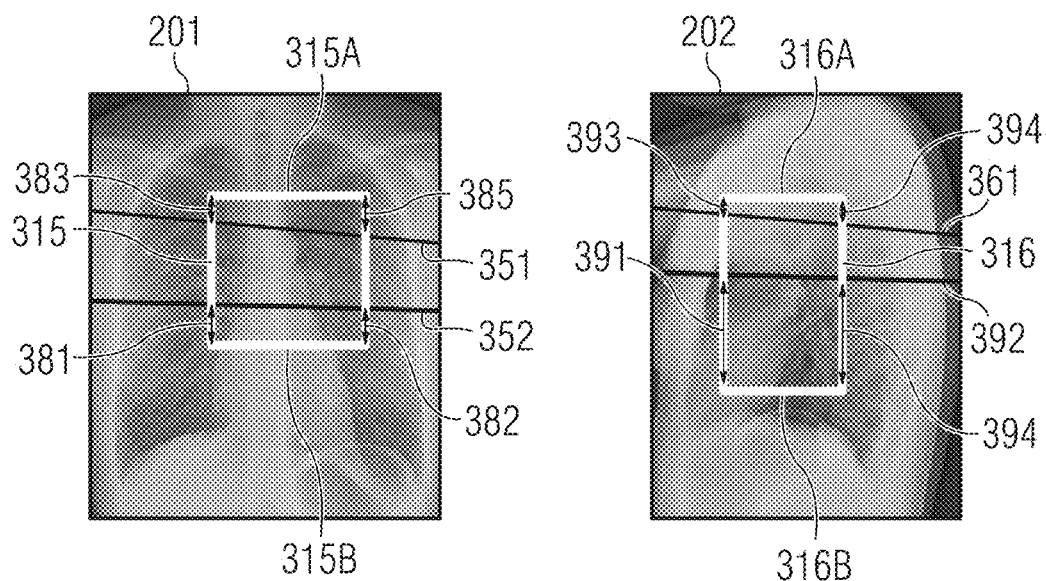
FIG. 5 schematically illustrates 2-D bounding boxes of a ROI according to various examples.

FIG. 5 illustrates the 2-D segmentations associated with the views of the 2-D projection images 201 and 202, here implemented as bounding boxes 315, 316. Also illustrated are the epipolar lines 351 and 352 of the upper edge 316A of the bounding box 316 associated with the 2-D projection image 202 and the lower edge 316B of the bounding box 316. Also illustrated are the epipolar lines 361 and 362 that are associated with the upper edge 315A and the lower edge 315B of the bounding box 315, respectively. Finally, distance measures 381-384 and 391-394 are illustrated.

Hence, the edges 315A, 315B, 316A, 316B define reference points used for determining the inter-view consistency.

An appropriate metric to determine a distance between, e.g., the epipolar line 351 and the upper edge 315A of the bounding box 315 could take into account, e.g., the distance measures 383 and the distance measures 384.

The overall inter-view consistency could take into account all distance measures 381-384, 391-394.

It would then be possible to enforce inter-view consistency. This can be done by adjusting the multiple 2-D segmentations. For example, the bounding boxes 315, 316 could be enlarged or shrunk. The aspect ratio may be changed. Respective scenarios are illustrated in FIG. 4 for box 3120 and box 3125.

At box 3120 of FIG. 4, it is checked whether the inter-view consistency determined at the current iteration of box 3115 fulfills a predefined criterion. For instance, where a distance between a first reference point in the first view and the epipolar line for the corresponding second reference point in the second view is determined, it would be possible to judge whether this distance is smaller than a predefined threshold. If this is the case, then the inter-view consistency is acceptable. Otherwise, it would be possible to adjust the 2-D segmentations, e.g., by increasing or decreasing the segmented area associated with at least one of the views, at box 3125.

Then, based on the adjusted 2-D segmentations, it would be possible to execute a further iteration of box 3115, i.e., determine the inter-view consistency for the updated 2-D segmentations.

Once a consistent set of 2-D segmentations has been found, box 3130 can be executed. Here, a classification of the ROI can be determined based on the multiple 2-D segmentations.

Thereby, also the accuracy of the classification can benefit of a more accurate determination of the 2-D segmentations as imposing epipolar constraints can help resolve ambiguities of single view isolated learning.

Figure 6:
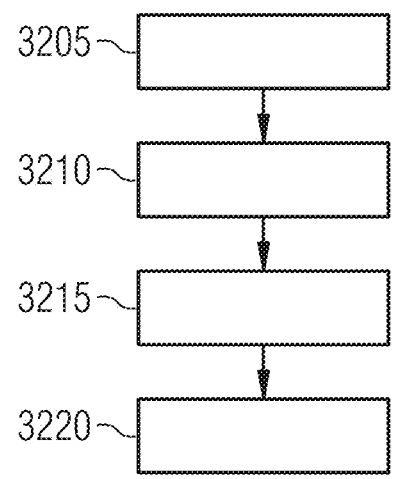
FIG. 6 is a flowchart of a method according to various examples.

FIG. 6 is a flowchart of a method according to various examples. For example, the method of FIG. 6 could be executed by the processor 94 of the device 92 upon loading program code from the memory 95. The method of FIG. 6 pertains to inference using a NN that has been previously trained. As such, FIG. 6 could be used to implement box 3010 of the method of FIG. 2.

The flowchart of FIG. 6 illustrates a scenario in which multiple 2-D segmentations are determined based on a common 3-D segmentation. Thereby, inter-view consistency can be inherently provided for, cf. TAB. 2: example I. For example, the method of FIG. 6 can rely on the projection matrix, cf. TAB. 1.

At box 3205, multiple 2-D projection images are obtained. Box 3205 can thus correspond to box 3105.

At box 3210, a 3-D segmentation of a ROI included in the scene is determined using the NN.

It is then possible, at box 3215, to determine multiple 2-D segmentations of the ROI associated with the multiple views of the scene associated with the multiple 2-D projection images that are obtained at box 3205 based on a predefined registration—e.g., the projection matrix—and based on the 3-D segmentation.

At box 3220, a classification of the ROI is performed. Box 3220 corresponds to box 3130.

Figure 7:
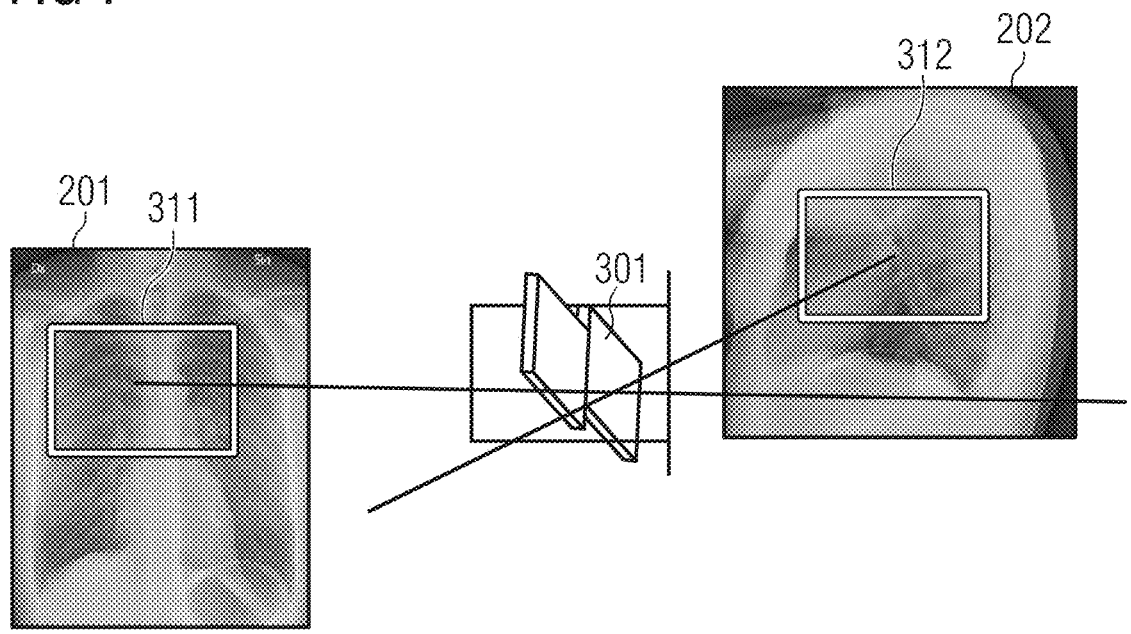
FIG. 7 schematically illustrates a 3-D segmentation of a ROI according to various examples.

FIG. 7 illustrates the 3-D segmentation 301 and the 2-D bounding boxes 311, 312 that can be derived, as in particular implementation of 2-D segmentations, based on the 3-D segmentation 301.

Figure 8:
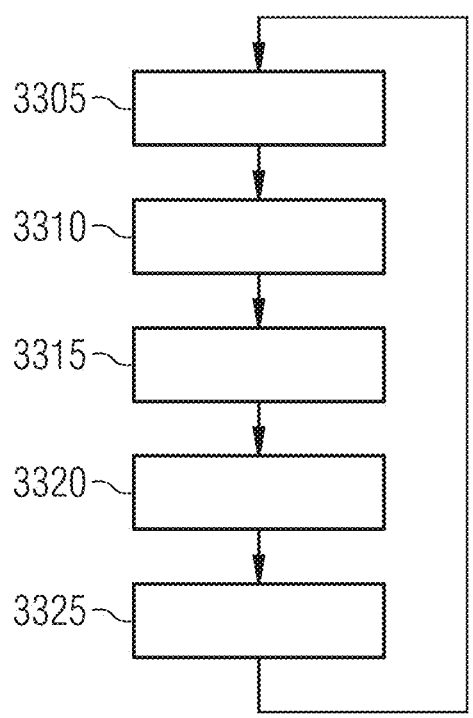
FIG. 8 is a flowchart of a method according to various examples.

FIG. 8 is a flowchart of a method according to various examples. For example, the method of FIG. 8 could be executed by the processor 94 of the device 92 upon loading program code from the memory 95. The method of FIG. 8 pertains to training of a NN. As such, FIG. 8 could be used to implement box 3005 of the method of FIG. 2.

Specifically, the method of FIG. 8 could be used to train a NN used, e.g., in the method of FIG. 4. The training of the NN of FIG. 8 can also be used for a NN that is used in the method of FIG. 6.

At box 3305, multiple 2-D projection images that are associated with multiple views of the scene are obtained. Box 3305 thus corresponds to either one of box 3105 and box 3205.

At box 3310, ground-truth labels are obtained for the multiple 2-D projection images of box 3305. For instance, a practitioner could manually annotate 2-D segmentations to each one of the multiple 2-D projection images obtained at box 3305.

The ground-truth labels define reference 2-D segmentations.

At box 3315, it is then possible to determine, using the at least one NN, multiple 2-D segmentations of the ROI.

At box 3320, it is then possible to determine a loss value based on the multiple 2-D segmentations, the multiple reference 2-D segmentations corresponding to the ground-truth labels, and a predefined registration of the multiple views in the reference frame.

Then, at box 3325, based on a loss value, parameter values can be adjusted, which is referred to training the at least one NN.

For example, determining the loss value at box 3320 could include determining an inter-view consistency between the 2-D segmentations associated with the multiple views as determined by the NN in box 3315. The loss value can thus depend not only on the difference of the 2-D segmentations determined by the NN from the reference 2-D segmentations, but also on the inter-view consistency. The inter-view consistency can be determined based on the predefined registration of the multiple views in the reference frame. Respective techniques have already been explained above in connection with box 3115 and FIG. 5 and can also be applied at this point.

The multiple 2-D segmentations could also be determined based on the predefined registration and a 3-D segmentation, as previously explained in connection with FIG. 6 and FIG. 7. The 3-D segmentation can be projected into the views associated with the 2-D projection images.

The method of FIG. 7 can be re-iterated for multiple sets of 2-D projection images.

Summarizing, techniques have been described that facilitate integrating the geometric relation between two views into the training of a NN and/or inference using the NN, to thereby obtain a better classification and/or detection by penalizing the network to incorporate the respective geometric relations.

This can lead to more accurate results that are further better interpretable and acceptable from the physicians that work with the Computer Aided Detection/Diagnosis device.

This is based on full knowledge about the orientation and position of a ROI in 3-D which allows the estimation of a 3-D segmentation.

Although at least some example embodiments have been shown and described with respect to certain preferred embodiments, equivalents and modifications will occur to others, skilled in the art upon the reading and understanding of the specification. Example embodiments include all such equivalents and modifications and is limited only by the scope of the appended claims.

We claim:

1. A method, comprising:
   obtaining multiple 2-D projection images associated with multiple views of a scene;
   determining, using at least one neural network algorithm and for the multiple 2-D projection images, multiple 2-D segmentations of a region of interest included in the scene, the multiple 2-D segmentations being associated with the multiple views; and
   based on a predefined registration of the multiple views in a reference frame, determining an inter-view consistency between the multiple 2-D segmentations associated with the multiple views, wherein
   the determining the inter-view consistency includes determining a distance between a first reference point of a first one of the multiple 2-D segmentations and a projection of a second reference point of a second one of the multiple 2-D segmentations into a view of the multiple views associated with the first one of the multiple 2-D segmentations,
   the first reference point and the second reference point denote a corresponding feature of the region of interest, and
   the projection of the second reference point is based on the predefined registration of the multiple views in the reference frame.

2. The method of claim 1,
   wherein said determining of the inter-view consistency is based on a fundamental matrix defining the predefined registration.

3. The method of claim 2, further comprising:
   enforcing the inter-view consistency by adjusting the multiple 2-D segmentations.

4. The method of claim 1, further comprising:
   enforcing the inter-view consistency by adjusting the multiple 2-D segmentations.

5. The method of claim 1,
   wherein the projection of the second reference point into the view associated with the first one of the multiple 2-D segmentations comprises an epipolar line defined in the view associated with the first one of the multiple 2-D segmentations.

6. The method of claim 1,
   wherein said determining of the multiple 2-D segmentations is based on a projection matrix defining the predefined registration.

7. The method of claim 1, further comprising:
   determining a classification of an object defining the region of interest based on the multiple 2-D segmentations.

8. The method of claim 1, further comprising:
   determining the predefined registration of the multiple views in the reference frame based on at least one of prior-knowledge of an appearance of the region of interest or a configuration of an imaging facility used to acquire the multiple 2-D projection images.

9. The method of claim 1, wherein the multiple 2-D projection images are x-ray images.

10. A method, comprising:
    obtaining multiple 2-D projection images associated with multiple views of a scene,
    determining, using at least one neural network algorithm and based on the multiple 2-D projection images, a 3-D segmentation of a region of interest included in the scene, and
    determining, based on a predefined registration of the multiple views in a reference frame and based on the 3-D segmentation, an inter-view consistency between multiple 2-D segmentations of the region of interest associated with the multiple views,
    wherein the determining the inter-view consistency includes determining a distance between a first reference point of a first one of the multiple 2-D segmentations and a projection of a second reference point of a second one of the multiple 2-D segmentations into a view of the multiple views associated with the first one of the multiple 2-D segmentations,
    the first reference point and the second reference point denote a corresponding feature of the region of interest, and
    the protection of the second reference point is based on the predefined registration of the multiple views in the reference frame.

11. The method of claim 10,
    wherein said determining of the multiple 2-D segmentations is based on a projection matrix defining the predefined registration.

12. The method of claim 10, further comprising:
    determining a classification of an object defining the region of interest based on the multiple 2-D segmentations.

13. The method of claim 12, further comprising:
    determining the predefined registration of the multiple views in the reference frame based on at least one of prior-knowledge of an appearance of the region of interest or a configuration of an imaging facility used to acquire the multiple 2-D projection images.

14. The method of claim 10, further comprising:
    determining the predefined registration of the multiple views in the reference frame based on at least one of prior-knowledge of an appearance of the region of interest or a configuration of an imaging facility used to acquire the multiple 2-D projection images.

15. A device, comprising:
a processor configured to,
    obtain multiple 2-D projection images associated with multiple views of a scene,
    determine, using at least one neural network algorithm and for the multiple 2-D projection images, multiple 2-D segmentations of a region of interest included in the scene, the multiple 2-D segmentations being associated with the multiple views, and
    based on a predefined registration of the multiple views in a reference frame, determine an inter-view consistency between the multiple 2-D segmentations associated with the multiple views, wherein
to determine the inter-view consistency, the processor is configured to determine a distance between a first reference point of a first one of the multiple 2-D segmentations and a projection of a second reference point of a second one of the multiple 2-D segmentations into a view of the multiple views associated with the first one of the multiple 2-D segmentations,
the first reference point and the second reference point is based on the predefined registration of the multiple views in the reference frame.

16. A device, comprising:
a processor configured to,
    obtain multiple 2-D projection images associated with multiple views of a scene,
    determine, using at least one neural network algorithm and based on the multiple 2-D projection images, a 3-D segmentation of a region of interest included in the scene, and
    determine, based on a predefined registration of the multiple views in a reference frame and based on the 3-D segmentation, an inter-view consistency between multiple 2-D segmentations of the region of interest associated with the multiple views, wherein
to determine the inter-view consistency, the processor is configured to determine a distance between a first reference point of a first one of the multiple 2-D segmentations and a projection of a second reference point of a second one of the multiple 2-D segmentations into a view of the multiple views associated with the first one of the multiple 2-D segmentations,
the first reference point and the second reference point denote a corresponding feature of the region of interest, and
the projection of the second reference point is based on the predefined registration of the multiple views in the reference frame.

* * * * *